US012662094B2

(12) United States Patent
Galizzi et al.

(10) Patent No.: US 12,662,094 B2
(45) Date of Patent: Jun. 23, 2026

(54) METHOD FOR CONTROLLING A BRAKING SYSTEM OF A VEHICLE AND RELATED SYSTEM

(71) Applicant: FRENI BREMBO S.P.A., Curno (IT)

(72) Inventors: Valerio Galizzi, Curno (IT); Massimo Di Stefano, Curno (IT); Luca Ugolini, Curno (IT); Fabrizio Forni, Curno (IT); Francesco Camozzi, Curno (IT)

(73) Assignee: Brembo S.p.A., Bergamo (IT)

( * ) Notice: Subject to any disclaimer, the term of this patent is extended or adjusted under 35 U.S.C. 154(b) by 1099 days.

(21) Appl. No.: 15/733,938

(22) PCT Filed: May 28, 2019

(86) PCT No.: PCT/IB2019/054396
§ 371 (c)(1),
(2) Date: Dec. 1, 2020

(87) PCT Pub. No.: WO2019/229641
PCT Pub. Date: Dec. 5, 2019

(65) Prior Publication Data
US 2021/0221341 A1     Jul. 22, 2021

(30) Foreign Application Priority Data
Jun. 1, 2018     (IT) ........................ 102018000005950

(51) Int. Cl.
*B60T 8/171* (2006.01)
*B60T 7/12* (2006.01)
(Continued)

(52) U.S. Cl.
CPC ................ *B60T 8/171* (2013.01); *B60T 7/12* (2013.01); *B60T 8/172* (2013.01); *B60T 13/74* (2013.01);
(Continued)

(58) Field of Classification Search
CPC . B60T 8/171; B60T 7/12; B60T 8/172; B60T 13/74; B60T 2201/03;
(Continued)

(56) References Cited

U.S. PATENT DOCUMENTS

| | | | | |
|---|---|---|---|---|
| 10,434,994 | B2 | 10/2019 | Edinger et al. | |
| 2004/0030473 | A1* | 2/2004 | Jianbo ................ | B60G 17/0162 |

(Continued)

FOREIGN PATENT DOCUMENTS

| | | |
|---|---|---|
| CN | 103863293 A | 6/2014 |
| CN | 106347330 A | 1/2017 |

(Continued)

OTHER PUBLICATIONS

European Patent Office, International Search Report with Written Opinion, issued in PCT/IB2019/054396, Sep. 17, 2019, 14 pages, European Patent Office, Rijswijk, Netherlands.

(Continued)

*Primary Examiner* — Rachid Bendidi
*Assistant Examiner* — Kirsten Jade M Santos
(74) *Attorney, Agent, or Firm* — Marshall & Melhorn, LLC

(57) ABSTRACT

A method for controlling a braking system of a vehicle may include detecting, by a first plurality of detection devices distributed on the braking system of the vehicle, first information representative of a condition of motion of the vehicle. The method may also include detecting, by a second plurality of detection devices belonging to a first driver assistance sub-system associated with the vehicle, second information representative of a condition of motion of the vehicle. The method may also include determining, by a first data processing block, a first control signal of a braking module of the vehicle based on the first information and the second information. The method may also include control- (Continued)

ling, by the first data processing block, the braking module of the vehicle based on the determined first control signal.

20 Claims, 5 Drawing Sheets

(51) Int. Cl.
  *B60T 8/172*         (2006.01)
  *B60T 13/74*         (2006.01)

(52) U.S. Cl.
  CPC ....... *B60T 2201/03* (2013.01); *B60T 2210/10* (2013.01); *B60T 2210/30* (2013.01); *B60T 2210/36* (2013.01); *B60T 2220/04* (2013.01); *B60T 2220/06* (2013.01); *B60T 2240/00* (2013.01); *B60T 2250/00* (2013.01); *B60T 2270/88* (2013.01)

(58) Field of Classification Search
  CPC ............. B60T 2210/10; B60T 2210/30; B60T 2210/36; B60T 2220/04; B60T 2220/06; B60T 2240/00; B60T 2250/00; B60T 2270/88; B60T 2201/10; B60T 8/885; B60T 8/96
  See application file for complete search history.

(56) References Cited

U.S. PATENT DOCUMENTS

| | | | | |
|---|---|---|---|---|
| 2014/0067220 | A1* | 3/2014 | Seiler ........................ | B60T 7/12 |
| 2014/0244127 | A1* | 8/2014 | Strengert et al. ......... | B60T 1/10 |
| 2017/0210381 | A1* | 7/2017 | Nishimura et al. ....... | B60T 7/12 |
| 2018/0134263 | A1* | 5/2018 | Edinger et al. .......... | B60Q 9/00 |
| 2020/0047737 | A1 | 2/2020 | Balogh | |

FOREIGN PATENT DOCUMENTS

| | | | |
|---|---|---|---|
| EP | 3315369 | A1 | 5/2018 |
| GB | 2512440 | A | 10/2014 |
| JP | 2009051403 | A | 3/2009 |
| JP | 2009190597 | A | 8/2009 |
| JP | 2014084012 | A | 5/2014 |
| JP | 2015221643 | A | 12/2015 |
| WO | WO/2011096938 | A1 | 8/2011 |
| WO | WO/2016024907 | A1 | 2/2016 |

OTHER PUBLICATIONS

China Intellectual Property Administration, Office Action in Application No. CN201980051337.6, dated Oct. 20, 2022, 12 pages.
China Intellectual Property Administration, Office Action in Application No. CN201980051337.6, dated Jul. 1, 2023, 22 pages.
Japan Patent Office, Office Action in Application No. JP2020567017, dated May 23, 2023, 6 pages.

* cited by examiner

METHOD FOR CONTROLLING A BRAKING SYSTEM OF A VEHICLE AND RELATED SYSTEM

FIELD OF THE INVENTION

The present invention relates to a braking system of a vehicle, in particular to a method for controlling a braking system of a vehicle and a related system.

BACKGROUND ART

Cars and road vehicles with more than two wheels intended to transport passengers in general are equipped with a handbrake, the function of which is to lock the wheels of the vehicle thus preventing its movement when it is parked.

In modern braking systems, e.g. those equipped with electronic Brake-By-wire (BBW) braking systems, the handbrake is replaced by an Electric Park Brake (EPB).

The EPB electric park brake is to all effects a sub-system of a BBW electronic braking system which is used to for service braking.

In more detail, by using the EPB sub-system, the driver can activate the wheel locking mechanism by means of a button which, once pressed, sends a braking park activation request to an electronic control unit of the vehicle which electrically actuates the brake pads to lock the brake discs and thus the movement of the vehicle.

Furthermore, in order to replace the park braking function traditionally performed by the handbrake, the EPB sub-system is configured to provide automatic supporting functions to the driver, such as the so-called "AUTO-HOLD" function, i.e. for locking the wheels automatically and without the driver's request when the vehicle is stationary, e.g. uphill, and releasing them as soon as the driver presses the accelerator pedal of the vehicle.

Therefore, the EPB sub-system can perform a park braking but also greater safety, ease and assistance to the driver in the use of the vehicle when the vehicle is stationary or stops during a journey.

In light of this, it is therefore essential for the EPB sub-system to work correctly and in particular not activate or be activated by the driver while the vehicle is traveling.

Typically, for determining whether a vehicle is in static or dynamic condition and thus controlling the EPB sub-system forbidding its activation if the vehicle is moving, the vehicle control unit processes information representative of the rotation speed of all wheels of the vehicle provided by respective speed sensors of the encoder type associated with the individual wheels.

However, such speed sensors, in addition to being necessarily integrated in BBW sub-system, are particularly prone to failure.

Therefore, if the speed sensors were to stop working, it would not be possible to obtain timely and reliable information on the state of motion of the vehicle and therefore a reliable and timely control of the EPB sub-system.

SUMMARY

It is the object of the present invention to devise and provide a method for controlling a braking system of a vehicle which allows to at least partially avoid the drawbacks described above with reference to the prior art and which particularly ensures a control as reliable, timely and safe as possible.

Such an object is achieved by a method for controlling a braking system of a vehicle, comprising steps of:

detecting, by a first plurality of detection devices distributed on the braking system of the vehicle, first information representative of a condition of motion of the vehicle;

detecting, by a second plurality of detection devices belonging to a first driver-assistance sub-system associated with the vehicle, second information representative of a condition of motion of the vehicle;

determining, by a first data processing block, a first control signal of a braking module of the vehicle based on said first information and said second information;

controlling, by the first data processing block, the braking module of the vehicle based on the determined first control signal.

The present invention also relates to an electronic control system of a braking system of a vehicle.

Some advantageous embodiments are the subject of the dependent claims.

DRAWINGS

Further features and advantages of the method and system according to the invention will become apparent from the following description of preferred embodiments, given by way of indicative, non-limiting examples, with reference to the accompanying drawings, in which.

DESCRIPTION OF PREFERRED EMBODIMENTS

Figure 1:
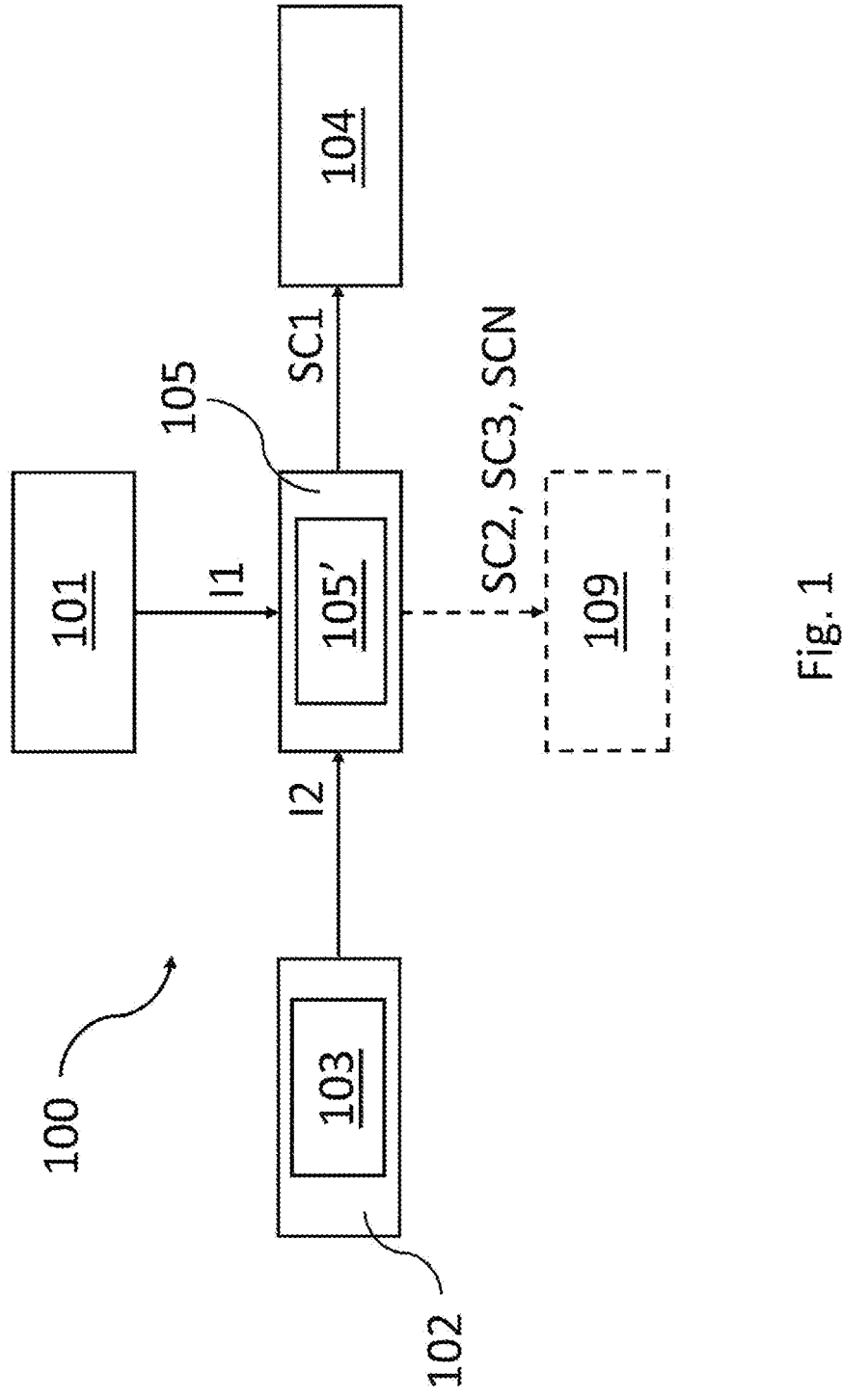
FIG. 1 shows, by means of a block chart, an electronic control system of a braking system of a vehicle, according to an embodiment.

With reference now to FIGS. 1-4, reference numeral 100 indicates as a whole an electronic control system of a braking system of a vehicle, hereinafter also electronic system or simply system, according to the present invention.

It is worth noting that equal or similar elements in the figures will be indicated by the same numeric or alphanumeric references.

For the purposes of the present description, vehicle means any vehicle or motorcycle, also of commercial type, having two, three, four or more wheels.

Additionally, braking system, also not shown in the figures, means a set of all components (mechanical and/or electric or electronic, also the brake fluid) which contribute to generating the braking of a vehicle, whether it be a service braking or a parking braking.

With reference in general to FIGS. 1-4, the system 100, in an embodiment comprises a first plurality 101 of detection devices distributed on the braking system of the vehicle configured to detect first information I1 representative of a condition of motion of the vehicle.

The first plurality 101 of detection devices comprises both one or more rotation speed sensors of the vehicle wheels (e.g. encoders connected to each vehicle wheel), position sensors of a brake pedal of the vehicle, directly connected to the brake pedal, or sensors for detecting the position of an accelerator pedal of the vehicle, directly connected to the accelerator pedal of the vehicle and force or pressure sensors connected to the brake pedal and/or the accelerator pedal or connected to the brake calipers or to respective actuators of brake calipers of the braking system or other components of the braking system.

In order words, in an embodiment, each device of said first plurality 101 of detection devices belongs to the group consisting of: rotation speed sensor of a vehicle wheel; position sensor of a brake pedal of the vehicle; position sensor of an accelerator pedal of the vehicle; force or pressure sensors connected to the brake pedal and/or accelerator pedal or connected to brake calipers or respective actuators of the brake calipers of the braking system or other components of the braking system.

In this respect, first information I1 representative of a condition of motion of the vehicle means the information or a combination of the information detected by each of the detection devices of said first plurality 101 of detection devices distributed in the braking system of the vehicle.

It is worth repeating that each piece of information I1 depends on the type of detection device.

By way of example, if the detection device is a speed sensor of a vehicle wheel, the first information I1 will be the vehicle speed estimated from the rotation speed (wheel revolutions) of the vehicle wheel. Such an estimate can be obtained, for example, by averaging the speed of one wheel of the vehicle with respect to the other wheels or by taking the median rotation speed of all the wheels of the vehicle or other combination.

If the detection device is a position sensor of a brake pedal or accelerator pedal of the vehicle, the first information I1 may be a braking request of the vehicle or an acceleration request of the vehicle.

In greater detail, the vehicle braking request or the vehicle acceleration request may be determined, respectively, on the basis of the position of the brake pedal of the vehicle or of the accelerator pedal of the vehicle, and a respective characteristic curve (e.g. the position of the brake pedal of the vehicle/braking request or the position of the accelerator pedal of the vehicle/acceleration request).

From the examples above, it is apparent that the condition of motion is related to whether the vehicle is traveling (e.g. vehicle speed not zero, no braking request and acceleration request not zero) or not (e.g. zero vehicle speed, non-zero braking request and any acceleration request). It should be noted that the examples shown define typical cases and are those which increase the reliability of the information representative of the condition of motion of the vehicle, but may not always be true.

With reference in general to FIGS. 1-4, the system 100, in an embodiment, comprises a first driver assistance subsystem 102 associated with the vehicle, hereinafter also simply first sub-system 102.

The first sub-system 102 is the set of mechanical and/or electrical and/or electronic components which contribute to providing advanced service to the driver while driving. One type of such a first sub-system 102 is also known by the acronym ADAS, (Advanced Driver Assistance System).

In greater detail, the first sub-system 102 comprises a second plurality 103 of detection devices configured to detect second information I2 representative of a condition of motion of the vehicle.

In particular, according to an embodiment, the second plurality 103 of detection devices comprises any device installed aboard the vehicle and belonging to the first sub-system 102, i.e. a sub-system of ADAS type, adapted and configured to provide information on the position of the vehicle by means of which it is possible to estimate the condition of motion of the vehicle, i.e. whether the vehicle is moving or not.

Such detection devices of the aforesaid type may be either passive or active.

A passive detection device is such as to receive information passively.

Examples of passive type detection devices present in the first sub-system 102 of ADAS type are: a digital camera, an infrared digital camera, a satellite navigation system, e.g. of GPS (Global Positioning System) type or equivalent.

An active detection device is configured to emit radiation and measure the response of the irradiated signals reflected by objects. This type of detection device advantageously allows measurements to be taken regardless of lighting conditions in the environment surrounding the vehicle, i.e. of the season or hour of the day.

Examples of active type detection devices present in the first sub-system 102, of the ADAS type, are: long range type radar module, a short/medium range type radar module, LIDAR type remote sensing module or ultrasound detection module.

In other words, in an embodiment, each device of said second plurality 103 of detection devices belongs to the group consisting of: digital camera; infrared digital camera; satellite navigation system, GPS or the like; long range radar module; short/medium range radar module; remote sensing module of LIDAR type; ultrasound detection module.

In this respect, second information I2 representative of a condition of motion of the vehicle means the information or a combination of the information detected by each of the detection devices of the aforesaid second plurality 103 belonging to the first driver assistance sub-system 102 associated with the vehicle.

It is worth repeating that each piece of information I2 depends on the type of detection device.

By way of example, if the detection device is a digital camera or an infrared digital camera, the second information I2 may be a digital image from which to estimate the speed and/or "stopped" position of the vehicle. For example, this may be estimated by detecting the same digital image without any change for a respective set interval of time.

If the detection device is a satellite navigator, the second information I2 may be an estimate of the vehicle speed and/or an estimate of the "stopped" position of the vehicle. For example, this can be estimated by detecting the same position without any variation or the same zero speed for a respective set interval of time.

If the detection device is a V2V communication module, the second information I2 may be an estimate of the vehicle speed according to the speed of another vehicle.

If the detection module is a long-range type radar module, a short/medium-range type radar module, a LIDAR type remote sensing module or an ultrasound detection module, the second information I2 may be an estimate of the vehicle speed starting from the interpolation of a plurality of points in space. For example, this may be estimated by measuring the same information for a respective predetermined interval of time.

From the examples shown above, it is apparent that the condition of motion is related to whether the vehicle is traveling (vehicle speed not zero) or not (vehicle speed zero).

With reference to FIGS. 1-4, according to an embodiment, the system 100 further comprises a vehicle braking module 104.

The braking module 104 is part of the braking system of the vehicle.

The braking module 104 is configured to apply a braking action on one or more motion components of the vehicle (e.g. the vehicle wheels, not shown in the figures) operatively connected to the vehicle braking system.

In greater detail, the braking module 104 is configured to receive a first control signal SC1, described below.

As described below, the first control signal SC1, in an embodiment, comprises an inhibition signal of the activation of the braking module 104 of the vehicle.

According to a further embodiment, in combination with the previous one, the first control signal SC1 comprises an activation signal of the braking module 104 of the vehicle.

Turning back to FIGS. 1-4, it is worth noting that in an embodiment, the braking module 104 comprises an electric park brake, e.g. of the EPB type.

In a further embodiment, either alternatively or in combination with the previous one, the vehicle braking module 104 comprises an electric service brake, e.g. the BBW type.

Again with reference in general to FIGS. 1-4, in an embodiment, the system 100 further comprises a first data processing block 105, e.g. a microprocessor or a microcontroller, operatively connected to said first plurality 101 of detection devices, to said driver assistance sub-system 102 and to said vehicle braking module 104.

It is worth noting that "data processing block" means either a single block installed on an electronic control unit or a plurality of blocks, operatively connected to one another, distributed on two or more electronic control units present on the vehicle.

Furthermore, the system 100 further comprises a respective first memory block 105', operatively connected to the first data processing block 105, configured to store one or more program codes which can be run by the first data processing block 105 and to store data processed by the first data processing block 105 when running said one or more program codes.

Figure 2:
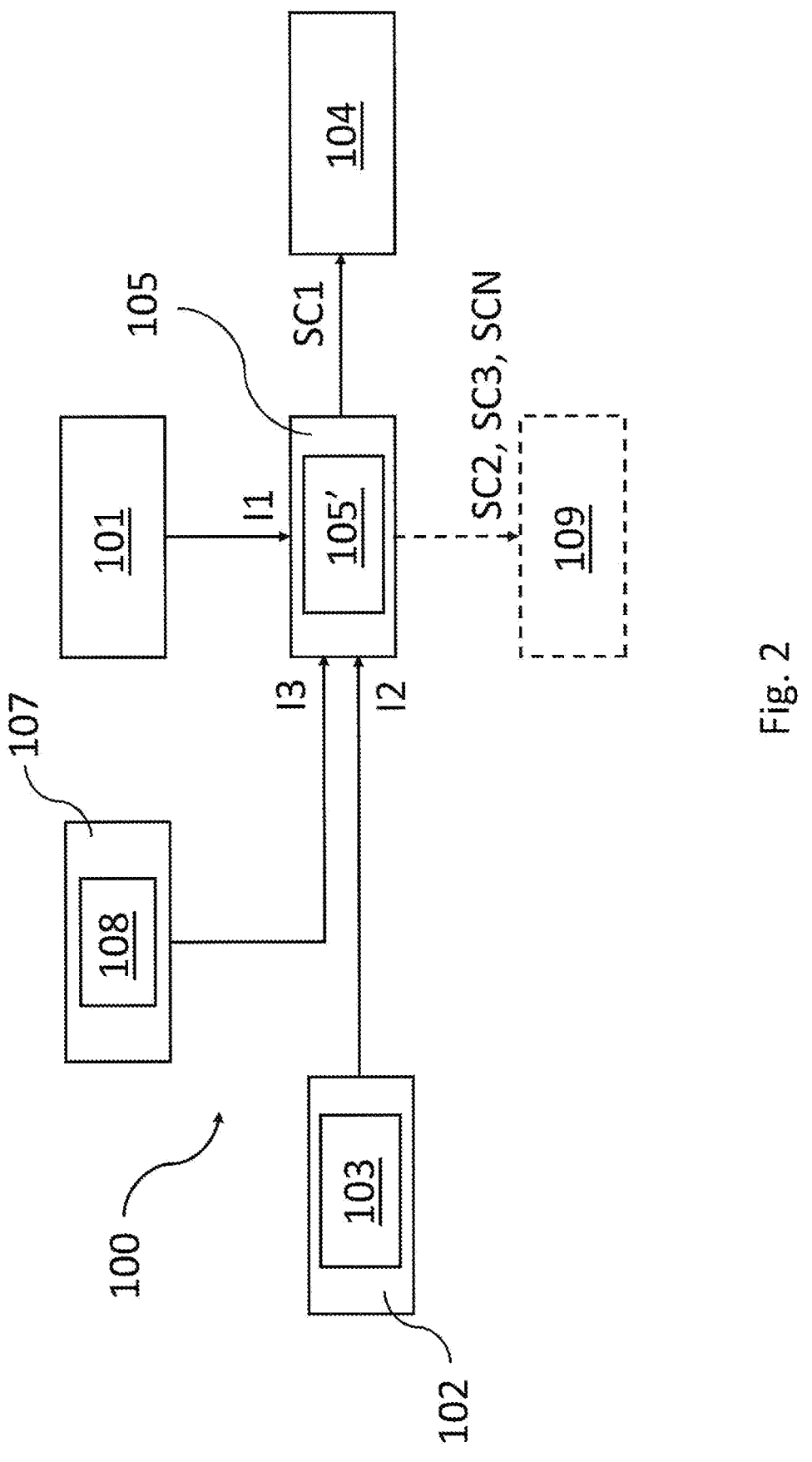
FIG. 2 shows, by means of a block chart, an electronic control system of a braking system of a vehicle, according to a further embodiment.

It is worth noting that the first memory block 105' may be inside the first data processing block 105, as shown in FIGS. 1 and 2 or, in an alternative embodiment (not shown in the figures), outside the first data processing block 105.

It is worth noting that the running, by the first data processing block 105, of respective program codes, allows the system 100 to run the method for controlling a vehicle braking system, which is the object of the present invention, described in greater detail below.

In this respect, it is worth noting that the first data processing block 105, according to an embodiment, is configured to determine the first control signal SC1 on the basis of said first information I1 and said second information I2.

It is worth noting that in an embodiment, the first data processing block 105 corresponds to the so-called brake controller.

With reference to FIGS. 1 and 2, according to an embodiment, the first driver assistance sub-system 102, and thus the second plurality 103 of detection devices, is directly connected to the first data processing block 105.

Figure 3:
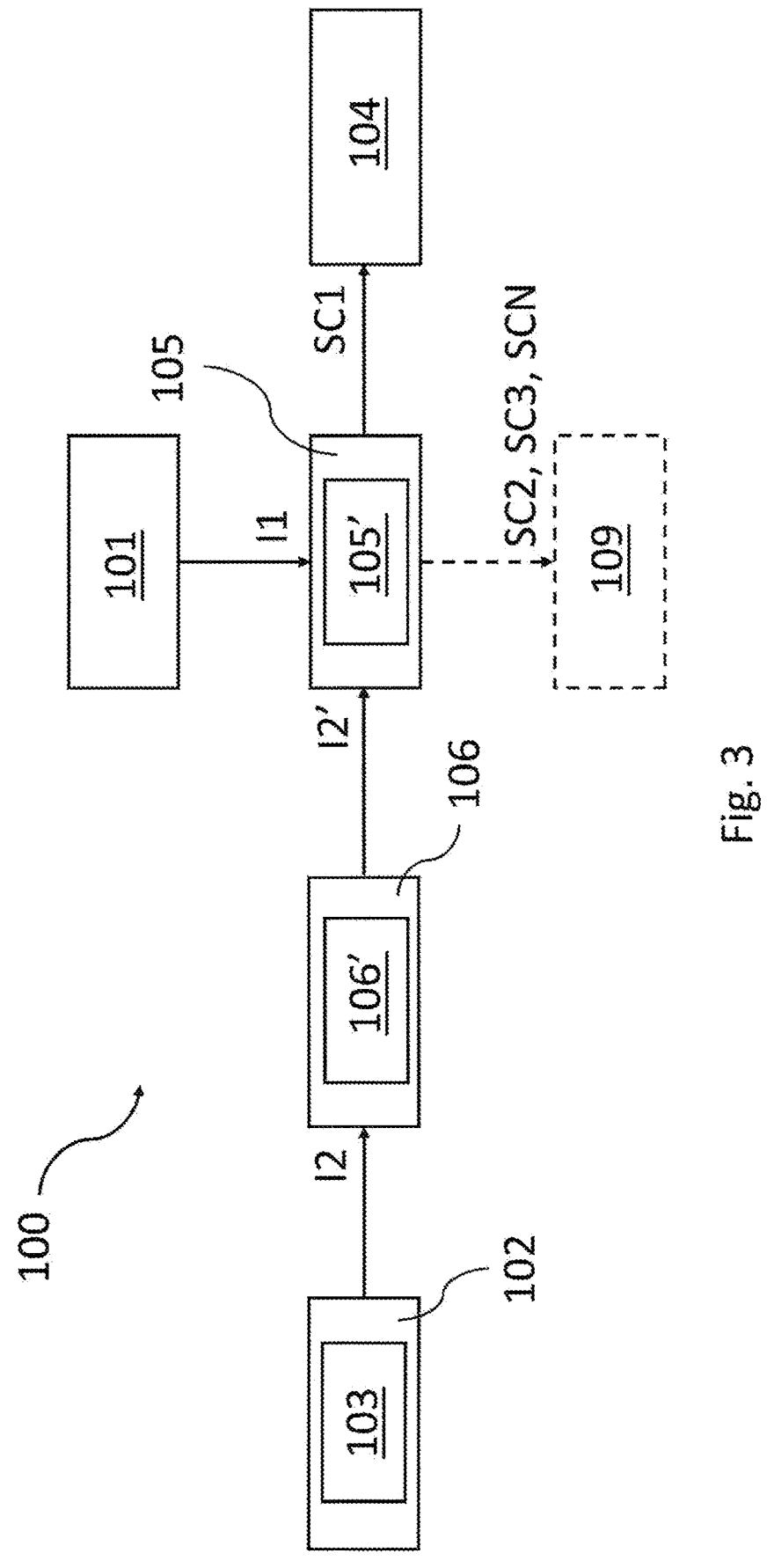
FIG. 3 shows, by means of a block chart, an electronic control system of a braking system of a vehicle, according to a further embodiment.
Figure 4:
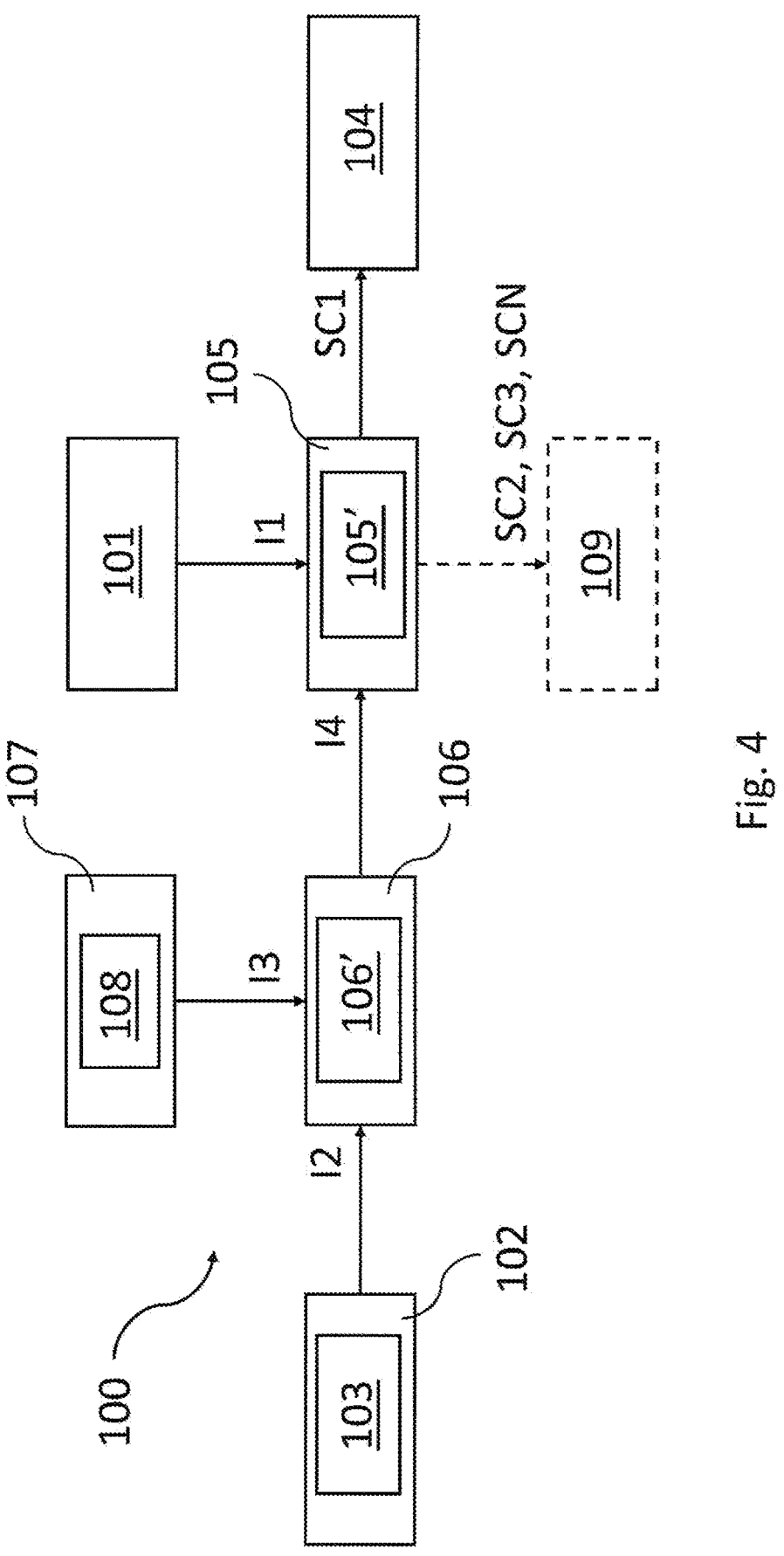
FIG. 4 shows, by means of a block chart, an electronic control system of a braking system of a vehicle, according to a further embodiment.

According to a further embodiment, alternative to the previous one and shown in FIGS. 3 and 4, the system 100 further comprises a second data processing block 106, e.g. a microprocessor or a microcontroller.

The first sub-system 102 is connected to the first data processing block 105 by means of the second, directly connected to the first driver assistance sub-system 102, and thus to the second plurality 103 of detection devices.

Furthermore, the system 100 further comprises a respective second memory block 106', operatively connected to the second data processing block 1016, configured to store one or more program codes which can be run by the second data processing block 106 and to store the data processed by the second data processing block 106' when running said one or more program codes.

It is worth noting that the second memory block 106' may be inside the second data processing block 106, as shown in FIGS. 3 and 4 or, in an alternative embodiment (not shown in the figures), outside the second data processing block 106.

It is worth noting that the running, by the second data processing block 106, of respective program codes, contributes to the running, by the system 100, of the method for controlling a vehicle braking system, which is the object of the present invention, described in greater detail below.

In this embodiment, as will be described below with reference to an embodiment of the method which is the object of the present invention, the second data processing block 106 is configured to determine additional second information I2' on the basis of said second information I2.

In this embodiment, the first data processing block 105 is configured to determine the first control signal SC1 on the basis of said first information I1 and of said further second information I2'.

It is worth noting that in an embodiment, the second data processing block 106 corresponds to the so-called vehicle control system, i.e. the so-called Electronic Control Unit (ECU) of the vehicle.

According to a further embodiment, shown in FIG. 2, the system 100 further comprises a second vehicle data connection sub-system 107.

The second vehicle data connection sub-system 107 comprises a third plurality 108 of detection devices configured to detect third information I3 representative of a condition of motion of the vehicle.

In greater detail, according to an embodiment, the third plurality 108 detection devices comprises any device, belonging to the second data connection sub-system 107, adapted and configured to connect to one or more data communication networks to transmit and/or receive information on the state of the vehicle, on the states of other vehicles or infrastructures (e.g. buildings, bridges, highways, extra-urban roads, urban streets or other structures according to the type of road infrastructure and so forth) located near the vehicle.

Such detection devices of the aforesaid type can be: a satellite navigation system, e.g. of GPS (Global Positioning System) type or equivalent, configured to retrieve information, such as geolocation of the vehicle, static or dynamic information representative of the route of the vehicle, information representative of the instantaneous speed of the vehicle and so on; a communication module of V2V (Vehicle to vehicle) type to retrieve information, such as information representative of the basic state of the vehicle and of the proximity of another vehicle, information representative of the state of the traffic along the route of the vehicle and so forth; a communication module of V2I (Vehicle To Infrastructure) type to retrieve information, such as information representative of the weather (e.g., humidity, wind, temperature), information representative of the state of traffic controllers along the road of the route of the vehicle and so forth.

In other words, in an embodiment, each device of said third plurality 108 detection devices belongs to the group consisting of: satellite navigator GPS or equivalent, communication module of V2V type, communication module of V2I type.

In this respect, third information I3 representative of a condition of motion of the vehicle means the information or a combination of the information detected by each of the detection devices of the aforesaid third plurality 108 belonging to the second vehicle data connection sub-system 107.

It is worth repeating that each piece of information I3 depends on the type of detection device.

By way of example, if the detection device is a satellite navigator, the third information I3 may be an estimate of the vehicle speed and/or an estimate of the "stopped" position of the vehicle.

In other words, the second data connection sub-system 107 may send data, such as the speed of the vehicle or the position of the vehicle, which may be either relative to an infrastructure or absolute.

If the detection device is a V2V communication module, the third information I3 may be an estimate of the vehicle speed according to the speed of another vehicle.

If the detection device is a V2I communication module, third information I3 may be an estimate of the vehicle speed and/or an estimate of the "stopped" position of the vehicle with the addition of information, such as positioning of antennas or repeaters in 3G or 4G type communication, from which to estimate the vehicle speed.

In other words, a V2I communication module can communicate the position of information sources (antennas or repeaters) from which it is possible to determine the position of the vehicle or the relative speed of the vehicle.

Returning to the embodiment of FIG. 2, the second data connection sub-system 107 is directly connected to the first data processing block 105.

As will be described in greater detail below with reference to an embodiment of the method which is the object of the present invention, the first data processing block 105, according to the embodiment in FIG. 2, is configured to determine the control signal SC1 on the basis of said first information I1, of said second information I2 and of said third information I3.

With reference to an embodiment, shown in FIG. 4, in combination with that in which the second data processing block 106 is located (e.g. that of FIG. 3), the system 100 comprises a second data connection sub-system 107 of the vehicle.

The second vehicle data connection sub-system 107 comprises a third plurality 108 of detection devices configured to detect third information I3 representative of a condition of motion of the vehicle.

It is worth noting that the second sub-system 107 and the third plurality 108 of detection devices are the same as those already described previously with reference to the embodiment in FIG. 2.

According to the embodiment of FIG. 4, the first data processing block 105 is connected to the second data connection sub-system 107 by means of the second data processing block 106.

In this embodiment, as will be described below with reference to an embodiment of the method of the present invention, the second data processing block 106 is configured to determine fourth information I4 representative of a vehicle motion condition on the basis of said second information I2 and of said third information I3.

In this embodiment, the first data processing block 105 is configured to determine the first control signal SC1 on the basis of said first information I1 and of said fourth information I4.

According to a further embodiment, in combination with any one of those previously described, shown with dashed lines in the FIGS. 1-4, the first data processing block 105 is further configured to identify a safe or non-safe condition of the vehicle on the basis of said first information I1 and said second information I2.

For the purposes of the present description, "safe" condition of a vehicle means a combination of vehicle conditions representative of the fact that the vehicle be safe with respect to possible obstacles or that it is not necessary to press the brake pedal in a rapid and timely manner due to an emergency (thus, also in case of absence of obstacles, e.g. a clear road).

In other words, the safe condition is that far from a possible braking or emergency braking (due to obstructions, pedestrians, distance between vehicles and infrastructure).

By way of example, a possible combination of vehicle conditions adapted to identify a safe condition of the vehicle, e.g. also as a function of the infrastructure type (highways, extra-urban roads, urban roads and so forth), may be the following:

vehicle speed<set maximum speed value which can be defined as "high speed", e.g. 130 km/h, if the type of infrastructure is, for example, a highway;

brake pedal position: released;

distance from a preceding vehicle on the road>set minimum distance value, e.g. 50 m.

If a safe condition of the vehicle is not identified by the first data processing block 105, then an "unsafe" condition of the vehicle is identified.

According to the embodiment, in FIG. 1, the first data processing block 105 is configured to identify a safe or non-safe condition of the vehicle on the basis of said first information I1 and said second information I2.

According to the embodiment in FIG. 2, the first data processing block 105 is configured to identify the safe or non-safe condition of the vehicle on the basis of said first information I1, of said second information I2 and of said third information I3.

According to the embodiment in FIG. 3, the first data processing block 105 is configured to identify the safe or non-safe condition of the vehicle on the basis of said first information I1 and of said further second information I2 (in turn determined by the second data processing block 106 according to said second information I2).

According to the embodiment in FIG. 4, the first data processing block 105 is configured to identify a safe or non-safe condition of the vehicle on the basis of said first information I1 and of said fourth information I4 (in turn determined by the second data processing block 106 on the basis of said second information I2 and of said third information I3).

According to any one of the claims previously described, it is worth noting that the system 100 comprises a service braking module 109 operatively connected to the first data processing block 105.

The service braking module 109 is part of the vehicle braking system.

In greater detail, the service braking module 109 comprises a plurality of actuators (not shown in the figures) of the vehicle braking system.

Each actuator (electromechanical or electro-hydraulic) is configured to apply a service braking action on a respective brake disc installed on a respective motion component (wheel) of the vehicle.

The first data processing block 105 is configured to provide a second control signal SC2 to the service braking module 109, when the safe condition of the vehicle is identified.

The second control signal SC2 is such as to reduce and/or cancel the residual torque generated by the braking system on each disc brake installed on a respective motion component (wheel) of the vehicle.

Such a reduction or cancellation may be obtained, for example, by moving away the brake pads from the brake disc (increasing the gap or distance), by appropriately acting on the actuator (electromechanical or electro-hydraulic) of single electronic brake (e.g. to obtain the mechanical distancing of the pads from the brake disc and/or to obtain the reduction of the hydraulic pressure of the braking system).

Furthermore, the first data processing block 105 is configured to provide a third control signal SC3 to the service braking module 109, when an unsafe condition of the vehicle is identified and thus the safe condition of the vehicle is not identified, in order to reduce the distance between the pads and the respective brake disc installed on the respective motion component (wheel) of the vehicle.

In greater detail, the third control signal SC3 is such as to reduce the gap (thus the distance) between the pads and the disc brake in unsafe condition of the vehicle, by acting, for example, on the actuator (electromechanical or electro-hydraulic) of single electronic brake in an appropriate manner (e.g. to obtain the mechanical approach of the brake disc pads).

Thereby, it is possible to obtain a prompter braking system in case of unsafe condition of the vehicle, thus reducing the braking times and the stopping distance of the vehicle.

According to a further embodiment, in combination with any one of those previously described, the first data processing block 105 is configured to provide one or more control signals SCN to the service braking 109 module, when a vehicle stationary condition is either identified or not or a safe condition is either identified or not, or a further condition of the vehicle and/or of the environment and/or of the road surface and/or of an infrastructure is identified, to perform additional operations on the braking system or in general on the vehicle, e.g. cleaning the brake discs to remove rust or water, improving the load distribution on the motion components (wheels) and so forth.

In greater detail, in an embodiment, a condition can be the detection of water and/or humidity in the environment, detectable by means of respective rain sensors or one or more digital cameras which can be fitted on the vehicle.

Following the identification of the presence of this condition, the further operation which can be run on the braking system may be that of cleaning each brake disc before starting or restart the vehicle.

In a further embodiment, a condition may be that of detecting of an additional of a load on or more suspensions of the vehicle before starting, which can be detected by means of respective travel or pressure sensors with which the vehicle can be fitted.

Following the identification of the presence of this condition, the further operation which can be run on the braking system may be the calibration of the braking system with a specific balancing for the next braking.

According to further embodiments, a condition can be:

detecting the state of the road; e.g. the indication of uneven road surface or off-road surface which can be detected from the information provided by an infrastructure to the vehicle;

detecting the state of the road surface; e.g. which can be detected by a digital camera with which the vehicle is equipped adapted to detect a digital image to be compared to a reference image or texture;

detecting a state of a vehicle component; e.g. the status of a wheel which can be detected by means of a respective wheel status sensor with which the vehicle may be fitted.

Following the identification of the presence of one of these conditions, the further operation which can be run on the braking system may be the adjustment (raising/lowering) of the initial ABS intervention thresholds, the request for deceleration and so forth.

Turning back to FIGS. 1-4, it is worth noting that in an embodiment, shown for example in such figures, in which the braking module 104 comprises a parking brake, the service braking module 109 is different and in addition to the braking module 104.

According to another embodiment, not shown in the figures, in which the braking module 104 comprises a service brake, the service braking module 104 is comprised with the braking module 104.

According to a further embodiment, in combination with any one of those previously described and shown for example in FIGS. 3-4, if the second data processing block 106 is present, the first data processing block 105 and the second data processing block 106 are distinct from one another.

According to a further embodiment, as an alternative to the previous one and not shown in some of the figures, the first data processing block 105 and the second data processing block 106 coincide.

A method 500 for controlling a braking system of a vehicle according to the present invention will now be described with reference to the aforesaid figures and to the block chart in FIG. 5.

The method 500 comprises a symbolic step of starting ST.

A method 500 comprises a step of detecting 501, by a first plurality 101 of detection devices distributed on the braking system of the vehicle, first information I1 representative of a condition of motion of the vehicle.

The first plurality 101 of detection devices and the first information I1 representative of amotion condition of the vehicle have already been previously defined and described.

Figure 5:
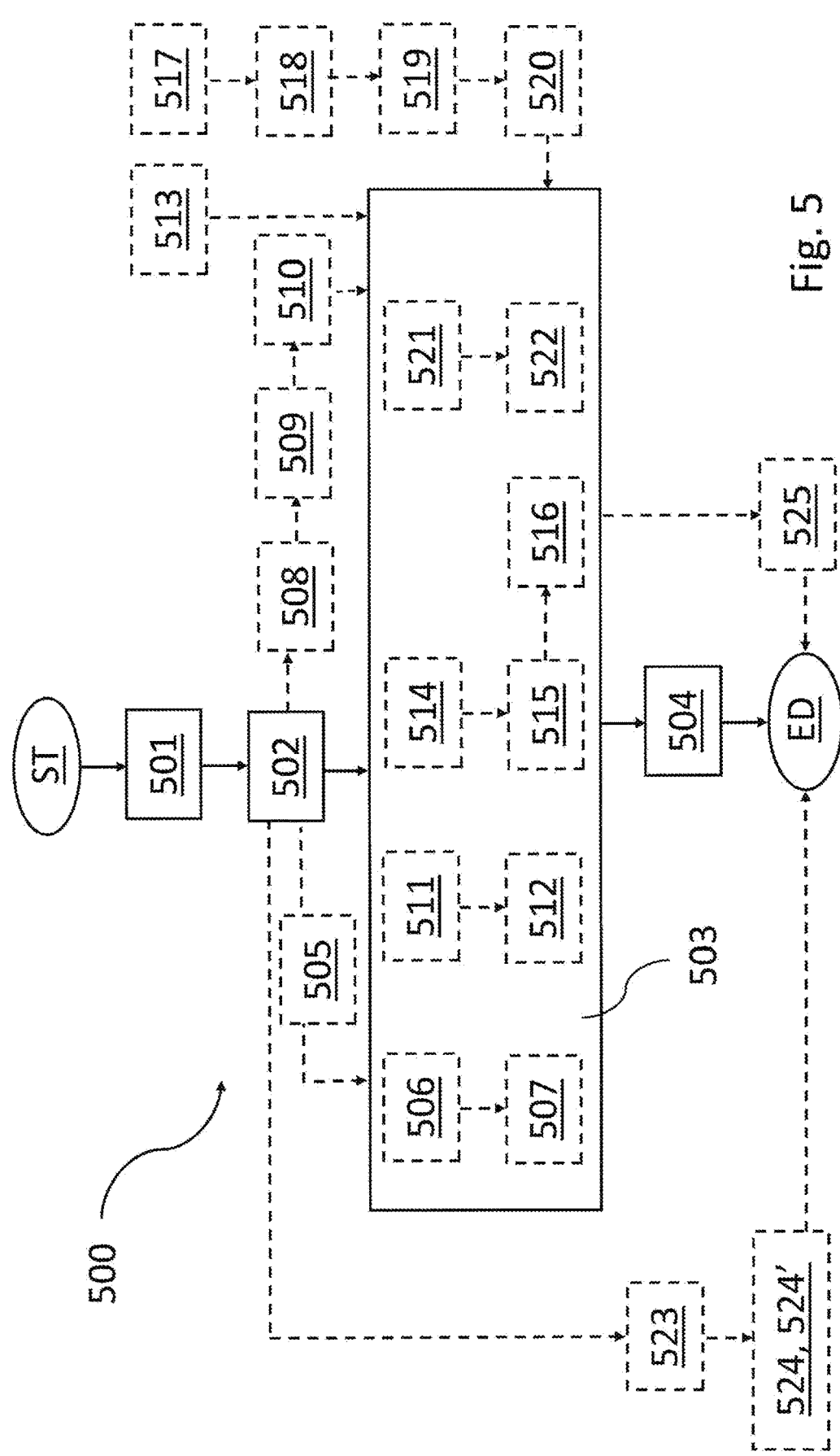
FIG. 5 shows, by means of a block chart, a method for controlling a braking system of a vehicle, according to an embodiment of the invention.

According to the embodiment in FIG. 5, the method 500 further comprises a step of detecting 502, by a second plurality 103 of detection devices belonging to a first driver assistance sub-system 102 associated with the vehicle, second information I2 representative of a condition of motion of the vehicle.

The second plurality 103 of detection devices and the second information I2 representative of a condition of motion of the vehicle have already been previously defined and described.

With reference to the embodiment in FIG. 5, the method 500 comprises a step of determining 503, by a first data processing block 105, a first control signal SC1 of a braking module 104 of the vehicle based on said first information I1 and said second information I2.

The first data processing block 105 and the braking module 104 have been previously defined and described.

With reference again to FIG. 5, the method 500 further comprises a step of controlling 504, by the first data processing block 105, the braking module 104 of the vehicle based on the determined first control signal SC1.

As shown in FIG. 5, the method 500 comprises a symbolic step of ending ED.

In an embodiment, shown by dashed lines in FIG. 5, the method 500 further comprises a step of providing 505, by the first plurality 101 of detection devices, said second information I2 directly to the first data processing block 105.

In this embodiment, the step of determining 503 is performed by the first data processing block 105, directly on the basis of the first information I1 and of the second information I2.

In greater detail, in an embodiment, shown with dashed lines in FIG. 5, the step of determining 503 comprises a respective first step of checking 506, by the first data processing block 105, if said first information I1 is representative of a first stopped vehicle condition.

In an embodiment, the first information I1 is checked as representative of a first stopped vehicle condition when the first stopped vehicle condition is maintained for a set first interval of time.

By way of example, if a detection device of said first plurality 101, e.g. a rotation speed sensor of a vehicle wheel, indicates that the rotation speed of the vehicle wheel is substantially zero or very close to zero, the first data processing block 105 estimates a vehicle speed equal to a value which is substantially zero or very close to 0 and if the vehicle speed assumes this substantially zero value (in a further embodiment, also for a first set interval of time equal to one or more seconds), the first data processing block 105 had checked the presence of a first stopped vehicle condition.

It is worth noting that the aforesaid estimate consists, for example, in comparing the speed of the vehicle with a respective threshold value (e.g. number of signals/time) and if the vehicle speed is lower than the respective threshold value then the vehicle speed is estimated to be equal to 0.

Furthermore, in this embodiment, shown again with dashed lines in FIG. 5, the step of determining 503 comprises a respective second step of checking 507, by the first data processing block 105, if said second information I2 is representative of a second stopped vehicle condition.

In an embodiment, the second information I2 is checked as representative of a second stopped vehicle condition when the second stopped vehicle condition is maintained for a set second interval of time.

By way of example, if a detection device of said second plurality 103, e.g. a digital camera, indicates that the vehicle has stopped (e.g. a digital image is detected without variations of a respective set interval of time, e.g. equal to one or more seconds), the first data processing block 105 estimates a vehicle speed equal to a value which is substantially zero or very close to 0 and if the vehicle speed assumes this substantially zero value (in a further embodiment, also for a second set interval of time equal to one or more seconds), the second data processing block 105 had checked the presence of a second stopped vehicle condition.

It is worth noting that the aforesaid estimate consists, for example, in comparing the speed of the vehicle with a respective threshold value (e.g. number of signals/time) and if the vehicle speed is lower than the respective threshold value then the vehicle speed is estimated to be equal to 0.

In this case, the checking, by the first data processing block 105, of both the first stopped vehicle condition and of the second stopped vehicle condition, implies the definitive determination, by the first data processing block 105, of the first control signal SC1 of the vehicle braking module 104.

In this case, the first control signal SC1 on the basis of which to check, by means of the first processing block 105, the braking module 104 of the vehicle comprises an inhibiting signal for the activation of the braking module 104 of the vehicle which will not be able to apply any braking action (electric park or service brake, according to the typology of the vehicle braking module 104) on the vehicle.

If the first step of checking 506 and the second step of checking 507 have as outcome that at least either the first stopped vehicle condition or the second stopped vehicle condition is not checked (vehicle speed not zero or, in a further embodiment, if the vehicle speed is not zero, such a value not zero is detected for an interval of time shorter than the set interval of time), then the first control signal SC1 comprises an activation signal of the vehicle braking module 104 which can apply a braking action (electric park or service brake, according to the type of vehicle braking module 104) on the vehicle.

According to a further embodiment, alternatively to the previous one, shown by dashed lines in FIG. 5, the method 500 further comprises a step of providing 508, by the second plurality 103 of detection devices, said second information I2 directly to a second data processing block 106.

The second data processing block 106 was previously defined and described.

In this embodiment, the method 500 further comprises a step of determining 509, by the second data processing block 106, further second information I2' representative of a condition of motion of the vehicle based on said second information I2.

For example, the second data processing block 106 determines the further second information I2' by decoding and aggregating the second information I2 to make them more reliable (e.g. the same information received from multiple sensors) and then the brake controller decides what to do according to its own information plus that provided by the VCS.

In this embodiment, the method 500 comprises a step of providing 510, by the second data processing block 106, said further second information I2' to the first data processing block 106.

In this embodiment, the step of determining 503 the first control signal SC1 of the braking module 104 of the vehicle is performed by the first data processing block 105 based on said first information I1 and said further second information I2'.

In greater detail, in an embodiment, shown with dashed lines in FIG. 5, the step of determining 503 comprises a respective first step of checking 511, by the first data processing block 105, if said first information I1 is representative of a first stopped vehicle condition.

In an embodiment, the first information I1 is checked as representative of a first stopped vehicle condition when the first stopped vehicle condition is maintained for a set first interval of time.

An example of implementation of this first step of checking 511 is entirely similar to the example of the implementation of the first step of checking 506, previously described.

Furthermore, in this embodiment, shown again with dashed lines in FIG. 5, the step of determining 503 comprises a respective second step of checking 512, by the first data processing block 105, whether said further second information I2' is representative of a second stopped vehicle condition.

In an embodiment, the further second information I2' is checked as representative of a second stopped vehicle condition when the second stopped vehicle condition is maintained for a set second interval of time.

By way of example, if a detection device of said second plurality 103, e.g. a digital camera, indicates that the vehicle has stopped (e.g. a digital image has been detected without variations for a respective set interval of time), the first data processing block 105, on the base of the further second information I2' provided by the second data processing block 106, estimates a vehicle speed equal to a value which is substantially zero or very close to 0 and if the vehicle speed assumes this substantially zero value (in a further embodiment, also for a second set interval of time equal to one or more seconds), the second data processing block 105 had checked the presence of the second stopped vehicle condition.

It is worth noting that the aforesaid estimate consists, for example, in comparing the speed of the vehicle with a respective threshold value (e.g. number of signals/time) and if the vehicle speed is lower than the respective threshold value then the vehicle speed is estimated to be equal to 0.

In this case, the checking by the first data processing block 105, both in the first stopped vehicle condition and in the second stopped vehicle condition, implies the definitive determination, by the first data processing block 105, of the first control signal SC1 of the vehicle braking module 104, i.e. an inhibition signal of the activation of the vehicle braking module 104 which will not be able to apply any braking action (electric park or service braking, according to the type of the vehicle braking module 104) on the vehicle.

If the first step of checking 511 and the second step of checking 512 have as outcome that at least either the first stopped vehicle condition or the second stopped vehicle condition is not checked (vehicle speed not zero or, in a further embodiment, if the vehicle speed is not zero, such a value is not zero is detected for an interval of time shorter than the set interval of time), then the first control signal SC1 comprises an activation signal of the vehicle braking module 104 which can apply a braking action (electric park or service brake, according to the type of vehicle braking module 104) on the vehicle.

According to a further embodiment, alternative to any of those previously described, shown in FIG. 5 with dashed lines, the method 500 further comprises a step of detecting 513, by a third plurality 108 of detection devices belonging to a second vehicle data connection sub-system 107, third information I3 representative of a condition of motion of the vehicle.

The third plurality 108 of detection devices, the second vehicle data connection sub-system 107 and the third information I3 were previously defined and described.

In this embodiment, the step of determining 503 the first control signal SC1 of the braking module 104 of the vehicle is performed by the first data processing block 105 based on said first information I1, said further second information I2' and said third information I3.

In greater detail, in an embodiment, shown with dashed lines in FIG. 5, the step of determining 503 comprises a respective first step of checking 514, by the first data processing block 105, if said first information I1 is representative of a first stopped vehicle condition.

In an embodiment, the first information I1 is checked as representative of a first stopped vehicle condition when the first stopped vehicle condition is maintained for a set first interval of time.

An example of implementation of this first step of checking 514 is entirely similar to the example of the implementation of the first step of checking 506, previously described.

Furthermore, in this embodiment, shown again with dashed lines in FIG. 5, the step of determining 503 comprises a respective second step of checking 515, by the first data processing block 105, if said second information I2 is representative of a second stopped vehicle condition.

In an embodiment, the second information I2 is checked as representative of a second stopped vehicle condition when the second stopped vehicle condition is maintained for a set second interval of time.

An example of implementation of this second step of checking 515 is entirely similar to the example of the implementation of the second step of checking 507, previously described.

In this embodiment, shown again with dashed lines in FIG. 5, the step of determining 503 further comprises a respective third step of checking 516, by the first data processing block 105, whether said second information I3 is representative of a third stopped vehicle condition.

In an embodiment, the third information I3 is checked as representative of a third stopped vehicle condition when the third stopped vehicle condition is maintained for a set third interval of time.

By way of example, if a detection device of said third plurality 108, e.g. a V2V type communication module, indicates that the vehicle has stopped (e.g. a constant distance from a preceding vehicle is detected), the first data processing block 105, on the base of the further third information I3 estimates a vehicle speed equal to a value which is substantially zero or very close to 0 and if the vehicle speed assumes this substantially zero value (in a further embodiment, also for a second set interval of time, e.g. equal to one or more seconds), the first data processing block 105 had checked the presence of the third stopped vehicle condition.

It is worth noting that the aforesaid estimate consists, for example, in comparing the speed of the vehicle with the speed of the vehicle ahead and if the speed of the vehicle and the speed of the vehicle ahead are equal to 0 then the speed of the vehicle is estimated to be equal to 0.

In this case, the checking, by the first data processing block 105, of the first stopped vehicle condition, the second stopped vehicle condition and the third stopped vehicle condition, implies the definitive determination, by the first data processing block 105, of the first control signal SC1 of the module 104 of the vehicle, i.e. an inhibition signal of the activation of the vehicle braking module 104 which will not be able to apply any braking action (electric park or service braking, according to the typology of the vehicle braking module 104) on the vehicle.

If the first step of checking 514, the second step of checking 515 and the third step of checking 516 have as outcome that at least either the first stopped vehicle condition or the second stopped vehicle condition or the third stopped vehicle condition is not checked (vehicle speed not zero or, in a further embodiment, if the vehicle speed is not zero, such a value is not zero is detected for an interval of time shorter than the set interval of time), then the first control signal SC1 comprises an activation signal of the vehicle braking module 104 which can apply a braking action (electric park or service brake, according to the type of vehicle braking module 104) on the vehicle.

According to a further embodiment, alternative to the previously one, shown again with dashed lines in FIG. 5, the method 500 comprises a step of detecting 517, by a third plurality 108 of detection devices belonging to a second vehicle data connection sub-system 107, third information I3 representative of a condition of motion of the vehicle.

The third plurality 108 of detection devices, the second vehicle data connection sub-system 107 and the third information I3 were previously defined and described with reference to other embodiments.

In this embodiment, the method 500 further comprises a step of providing 518, by the third plurality 108 of detection devices, said third information I3 directly to a second data processing block 106.

The second data processing block 106 were previously described with reference to other embodiments.

According to the present embodiment, the method 500 further comprises a step of determining 519, by the second data processing block 106, fourth information I4 representative of a condition of motion of the vehicle based on said second information I2 and said third information I3.

Such a processing is obtained, for example, by checking that the second information I2 is within a respective threshold and that the third information I3 is within a respective threshold.

Furthermore, the method 500 comprises a step of providing 520, by the second data processing block 106, said fourth information I4 to the first data processing block 105.

In this embodiment, the step of determining 503 the first control signal SC1 of the braking module 104 of the vehicle is performed by the first data processing block 105 on the basis of said first information I1 and said fourth information I4 (which depends on said second information I2).

In greater detail, in an embodiment, shown with dashed lines in FIG. 5, the step of determining 503 comprises a respective first step of checking 521, by the first data processing block 105, if said first information I1 is representative of a first stopped vehicle condition.

In an embodiment, the first information I1 is checked as representative of a first stopped vehicle condition when the first stopped vehicle condition is maintained for a set first interval of time.

An example of implementation of this first step of checking 521 is entirely similar to the example of the implementation of the first step of checking 506, previously described.

Furthermore, in this embodiment, shown again with dashed lines in FIG. 5, the step of determining 503 comprises a respective second step of checking 522, by the first data processing block 105, whether said fourth information I4 is representative of a second stopped vehicle condition.

In an embodiment, the fourth information I4 is checked as representative of a second stopped vehicle condition when the second stopped vehicle condition is maintained for a set second interval of time.

An example of implementation of this second step of checking 515 is entirely similar to the example of the implementation of the second step of checking 507, previously described.

By way of example, if a detection device of said second plurality 103, e.g. a digital camera, indicates that the vehicle has stopped (in the manner described above, for example) and if a detection device of said third plurality 108, e.g. a V2V type communication module, indicates in turn that the vehicle has stopped (in the manner show above, for example), the first data processing block 105, on the base of the further fourth information I4 provided by the second data processing block 106, estimates (in the manner described above, for example) a vehicle speed equal to a value which is substantially zero or very close to 0 and if the vehicle speed assumes this substantially zero value (in a further embodiment, also for a second set interval of time equal to one or more seconds), the second data processing block 105 had checked the presence of the second stopped vehicle condition.

In this case, the checking by the first data processing block 105 of the first stopped vehicle condition and the second stopped vehicle condition, implies the definitive determination, by the first data processing block 105, of the first control signal SC1 of the vehicle braking module 104 or an inhibition signal of the activation of the vehicle braking module 104 which will not be able to apply any braking action (electric park or service braking, according to the type of vehicle braking module 104) on the vehicle.

If the first step of checking 521 and the second step of checking 522 have as outcome that at least either the first stopped vehicle condition or the second stopped vehicle condition is not checked (vehicle speed not zero or, in a further embodiment, if the vehicle speed is not zero, such a value is not zero is detected for an interval of time shorter than the set time interval), then the first control signal SC1 comprises an activation signal of the vehicle braking module 104 which can apply a braking action (electric park or service brake, according to the type of vehicle braking module 104) on the vehicle.

According to a further embodiment, in combination with any one of those previously described, shown by dashed lines in FIG. 5, the method 500 further comprises the steps of:

identifying 523, by the first data processing block 105, a safe or unsafe condition of the vehicle based on said first information I1 and said second information I2;

if a safe condition of the vehicle is identified, providing 524, by the first data processing block 105, a second control signal SC2 to a service braking module 109 to reduce and/or cancel the residual torque generated by the braking system on each brake disc installed on a respective moving member of the vehicle;

if an unsafe condition of the vehicle is identified, providing 524', by the first data processing block 105, a third control signal SC3 to the service braking module 109 to reduce the distance between the brake pads and the respective brake disc installed on a respective moving member of the vehicle.

The safe condition of the vehicle and the second control signal SC2, the unsafe condition of the vehicle and the third control signal SC3 were previously defined and described.

According to an embodiment, the safe or unsafe condition of the vehicle is identified by the first data processing block 105 based on said first information I1 and further second information I2' provided by a second data processing block 106 (previously described).

According to a further embodiment, in combination with the previous one, the safe or unsafe condition of the vehicle is identified by the first data processing block 105 based on said first information I1, of said second information I2 and of third information I3 representative of a condition of motion of the vehicle detected by a third plurality 108 of detection devices belonging to a second data connection sub-system 107 of the vehicle (previously described).

According to a further embodiment, the safe or unsafe condition of the vehicle is identified by the first data processing block 105 based on said first information I1 and fourth information I4 representative of a condition of motion of the vehicle (previously described) determined by a second data processing block 106 based on said second information I2 and said third information I3.

In this respect, an example of implementation of the determination of a safe condition of the vehicle, in accordance to an embodiment of the present invention, is shown below.

On the basis of said first information I1, the first data processing block 105 determines information representative of a braking request RF, $RF=f(I1)$.

On the basis of said first information I1 and said second information I2, the first data processing block 105 determines a condition of motion of the vehicle VM, $VM=f(I1, I2)$.

It is worth noting that the condition of motion of the vehicle may be determined on the basis of said first information I1 and of said further second information I2' (if the second data processing block 106 present) or on the basis of said first information I1 and said fourth information I4 (if the second data processing block 106 is present).

On the basis of said second information I2 and of said third information I3, the first data processing block 105 determines information representative of a need for braking IF: $IF=f(I1, I2, I3)$.

The first data processing block 105, on the basis of the braking request RF, the condition of motion of the vehicle VM and of information representative of a braking need IF, given a value of safe condition of the vehicle $CS=f(RF, VM, IF)$.

If the safe condition value of the vehicle is identified as true, the first data processing block 105 provides the second control signal SC2 to the service braking module 109.

According to a further embodiment, in combination with any one of those previously described, when a stopped or non-stopped vehicle condition is identified, or when a safe or unsafe condition is identified, or when a further condition of the vehicle and/or of the environment and/or of the road surface and/or of an infrastructure is identified, the method 500 further comprises a step of providing 525, by the first information block 105, one or more further control signals SCN to the service braking module 109 to perform further operations on the braking system or on the vehicle in general, e.g., cleaning the brake discs from rust or water, improving the load distribution on the motion components (wheels) and so forth.

Examples of further conditions of the vehicle and/or the environment and/or of the road surface and/or of an infrastructure which can be detected and of the respective operations which can be performed on the braking system or in general on the vehicle have been previously described.

It is worth noting that the object of the present invention is fully achieved.

Indeed, the method and the related system according to the present invention advantageously allows to duplicate the first information I1 detected by the detection devices distributed in the braking system with the second information I2 detected by the detection devices present aboard the vehicle in the first driver assistance sub-system 102 associated with the vehicle or ADAS (Advanced Driver-Assistance System) sub-system.

Furthermore, the aforesaid information may be made further duplicated by the third information I3 which can be detected by the detection devices belonging to a second vehicle data connection sub-system 107, thus advantageously increasing the safety level of the system, thus the vehicle.

Additionally, through the use of the detection devices belonging to the first sub-system 102 (ADAS) and/or the use of the information available from the second vehicle data connection sub-system 107 advantageously allows to simplify the architecture and the configuration of the park brake module of EPB type, thus ensuring a greater safety in situations of faults of the sensors traditionally used.

For example, a vehicle equipped with a sub-system of the ADAS type can exploit the measurements performed by the detection devices of such a sub-system as braking module input information (e.g. EPB type, thus duplicating the information coming from the detection devices distributed in the braking system of the vehicle, e.g. speed sensors of the four wheels of the vehicle).

In this case, the detection devices which can be used by the braking module (e.g. EPB) are multiple and external to the braking system of the vehicle so as to differentiate the signal sources further and advantageously increase safety in the event of failure of one or more of the detection devices.

In the same manner, a vehicle provided with a data connection sub-system can exploit the information relating to the vehicle condition as a further input information for the braking module (e.g. EPB), duplicating the information of the detection devices distributed in the braking system and those belonging to the ADAS sub-system.

Furthermore, the method and the related system according to the present invention also allow to combine the first information detected by the detection devices distributed in the braking system with the second information detected by the detection devices belonging to the first sub-system 102 (ADAS) and the third information I3 detected by the detection devices belonging to the second data connection sub-system 107 of the vehicle to control the total residual torque of the vehicle advantageously in an active manner and reduce it in appropriate conditions (e.g. in a safe condition of the vehicle), thus reducing the mechanical losses due to residual torque of the brakes and increasing the overall efficiency of the vehicle.

Indeed, in traditional braking systems, one of the main factors which causes inefficiencies on vehicle level, and thus an increase in consumption and in PM emissions, is the phenomenon of drag torque generated by the residual friction between brake pad and disc in non-implemented braking conditions. However, in the case of modern braking systems of electronic Brake-By-wire (BBW) type, it is possible to control the gap between brake pads and disc so as to reduce and/or eliminate the residual torque, but on the other hand the widening of the gap implies an increased response time when the braking is implemented.

The method and system according to the present invention indeed allow such an active control (reduction) of the residual torque in a safe condition of the vehicle, i.e. the condition in which the vehicle is far from possible/probable braking events, identified by combining the first information I1 detected by the detection devices distributed in the vehicle braking system with the second information I2 detected by the detection devices belonging to the first sub-system 102 (ADAS) and the third information I3 detected by the detection devices belonging to the second vehicle data connection sub-system 107 (e.g. GPS location and maps, programmed route, information from another vehicle—V2V—or by other infrastructure V2X).

Finally, it is worth noting that the method and the related system of the present invention can also be used to reduce the residual torque even with traditional braking systems or electro-hydraulic braking systems equipped with ESP with adaptive functions or logic, i.e. with the possibility of controlling the gap between brake pad and brake disc.

In case of such systems, it is possible, for example, to control the gap between brake pads and disc so as to reduce the residual torque acting by means of ABS/ESP electronic control unit, by controlling the implementation of logical or adaptive functions only and exclusively out of condition identified as "safe", i.e. away from possible/probable braking events, by processing the first information I1, the second information I2 and the third information I3 as previously described.

Those skilled in art may make changes and adaptations to the method and the related system described above or can replace elements with others which are functionally equivalent in order to meet contingent needs without departing from the scope of the appended claims. All the features described above as belonging to one possible embodiment may be implemented irrespective of the other embodiments described.

The invention claimed is:

1. A method for controlling a braking system of a vehicle, comprising steps of:

detecting, by a first plurality of detection devices distributed on the braking system of the vehicle, first information representative of a condition of motion of the vehicle;

detecting, by a second plurality of detection devices belonging to a first driver-assistance sub-system associated with the vehicle, second information representative of a condition of motion of the vehicle;

determining, by a first data processing device, a first control signal of a braking module of the vehicle based on said first information and said second information;

controlling, by the first data processing device, the braking module of the vehicle based on the determined first control signal;

providing, by the second plurality of detection devices, said second information directly to a second data processing device;

determining, by the second data processing device, further second information representative of a condition of motion of the vehicle based on said second information;

providing, by the second data processing device, said further second information to the first data processing device, the step of determining the first control signal of the braking module of the vehicle being performed by the first data processing device based on said first information and said further second information, and identifying, by the first data processing device block, a safe or unsafe condition of the vehicle based on said first information and said second information;

if a safe condition of the vehicle is identified, providing, by the first data processing device block, a second control signal to a service braking module to reduce and/or cancel the residual torque generated by the braking system on each brake disc installed on a respective moving member of the vehicle;

if an unsafe condition of the vehicle is identified, providing, by the first data processing device block, a third control signal to the service braking module to reduce the distance between the brake pads and the respective brake disc installed on a respective moving member of the vehicle, wherein a safe condition is one in which the vehicle is moving and in which a brake pedal is not engaged, the distance from a preceding vehicle is at least a set minimum distance value or the vehicle is traveling more than a set maximum speed value, and wherein an unsafe condition is one in which the vehicle is moving and a brake pedal is engaged, the distance from the preceding vehicle is less than the set minimum distance value or the vehicle is traveling less than the set maximum speed value.

2. The method according to claim 1, comprising a step of providing, by the first plurality of detection devices, said second information directly to the first data processing device.

3. The method according to claim 2, wherein the step of determining further comprises:

a respective first step of checking, by the first data processing device, whether said first information is representative of a first stopped vehicle condition;

a second step of checking, by the first data processing device, whether said second information is representative of a second stopped vehicle condition.

4. The method according to claim 1, wherein the step of determining further comprises:

a respective first step of checking, by the first data processing device, whether said first information is representative of a first stopped vehicle condition;

a respective second step of checking, by the first data processing device, whether said further second information is representative of a second stopped vehicle condition.

5. The method according to claim 1, further comprising a step of:

detecting, by a third plurality of detection devices belonging to a second data connection sub-system of the vehicle, third information representative of a condition of motion of the vehicle;

the step of determining the first control signal of the braking module of the vehicle being performed by the first data processing device based on said first information, said further second information and said third information.

6. The method according to claim 5, wherein the step of determining further comprises:

a respective first step of checking, by the first data processing device, whether said first information is representative of a first stopped vehicle condition;

a respective second step of checking, by the first data processing device, whether said second information is representative of a second stopped vehicle condition;

a respective third step of checking, by the first data processing device, whether said third information is representative of a third stopped vehicle condition.

7. The method according to claim 1, further comprising a step of:

detecting, by a third plurality of detection devices belonging to a second data connection sub-system of the vehicle, third information representative of a condition of motion of the vehicle;

providing, by the third plurality of detection devices, said third information to the second data processing device;

determining, by the second data processing device, fourth information representative of a condition of motion of the vehicle based on said second information and said third information;

providing, by the second data processing device, said fourth information to the first data processing device, the step of determining the first control signal of the braking module of the vehicle being performed by the first data processing device based on said first information and said fourth information.

8. The method according to claim 7, wherein the step of determining further comprises:

a respective step of checking, by the first data processing device, whether said first information is representative of a first stopped vehicle condition;

a respective second step of checking, by the first data processing device, whether said fourth information is representative of a second stopped vehicle condition.

9. The method according to claim 1, wherein the safe or unsafe condition of the vehicle is identified by the first data processing device based on said first information and further second information provided by a second data processing device.

10. The method according to claim 1, wherein the safe or unsafe condition of the vehicle is identified by the first information device based on said first information, said second information and third information representative of a condition of motion of the vehicle detected by a third plurality of detection devices belonging to a second data connection sub-system of the vehicle.

11. The method according to claim 10, wherein the safe or unsafe condition of the vehicle is identified by the first data processing device based on said first information and fourth information representative of a condition of motion of the vehicle determined by a second data processing device based on said second information and said third information.

12. The method according to claim 1, further comprising, when a stopped or non-stopped vehicle condition is identified, or when a safe or unsafe condition is identified, or when a further condition of the vehicle and/or of the environment and/or of the road surface and/or of an infrastructure is identified, a step of providing, by the first information device, one or more further control signals to the service braking module to perform further operations on the braking system or on the vehicle in general.

13. The method according to claim 1, wherein the first control signal of the braking module of the vehicle comprises a signal inhibiting the activation of the braking module of the vehicle.

14. The method according to claim 1, wherein the first control signal of the braking module of the vehicle comprises an activation signal of the braking module of the vehicle.

15. An electronic control system of a braking system of a vehicle, comprising:

a first plurality of detection devices distributed on the braking system of the vehicle configured to detect first information representative of a condition of motion of the vehicle;

a first driver-assistance sub-system associated with the vehicle, said first sub-system comprising a second plurality of detection devices configured to detect second information representative of a condition of motion of the vehicle;

a braking module of the vehicle;

a first data processing device operatively associated with said first plurality of detection devices, to said first driver-assistance sub-system and to said braking module of the vehicle;

the system being configured to:

detect, by the first plurality of detection devices distributed on the braking system of the vehicle, first information representative of a condition of motion of the vehicle;

detect, by the second plurality of detection devices belonging to the first driver-assistance sub-system associated with the vehicle, second information representative of a condition of motion of the vehicle;

determine, by the first data processing device, a first control signal of a braking module of the vehicle based on said first information and said second information;

control, by the first data processing device, the braking module of the vehicle based on the determined first control signal, the system being configured to:

provide, by the second plurality of detection devices, said second information directly to a second data processing device;

determine, by the second data processing device, further second information representative of a condition of motion of the vehicle based on said second information;

provide, by the second data processing device, said further second information to the first data processing device, the first data processing device determines the first control signal of the braking module of the vehicle based on said first information and said further second information, and identify, by the first data processing device block, a safe or unsafe condition of the vehicle based on said first information and said second information;

if a safe condition of the vehicle is identified, provide, by the first data processing device block, a second control signal to a service braking module to reduce and/or cancel the residual torque generated by the braking system on each brake disc installed on a respective moving member of the vehicle;

if an unsafe condition of the vehicle is identified, provide, by the first data processing device block, a third control signal to the service braking module to reduce the distance between the brake pads and the respective brake disc installed on a respective moving member of the vehicle, wherein a safe condition is one in which the vehicle is moving and in which a brake pedal is not engaged, the distance from a preceding vehicle is at least a set minimum distance value or the vehicle is traveling more than a set maximum speed value, and wherein an unsafe condition is one in which the vehicle is moving and a brake pedal is engaged, the distance from the preceding vehicle is less than the set minimum distance value or the vehicle is traveling less than the set maximum speed value.

16. The system according to claim 15, wherein the braking module of the vehicle comprises an electric parking brake.

17. The system according to claim 15, wherein the braking module of the vehicle comprises an electric service brake.

18. The system according to claim 15, wherein each device of said first plurality of detection devices belongs to the group consisting of: rotation speed sensor of a vehicle wheel; position sensor of a brake pedal of the vehicle; position sensor of an accelerator pedal of the vehicle; force or pressure sensors connected to the brake pedal and/or accelerator pedal or connected to brake calipers or respective actuators of the brake calipers of the braking system or other components of the braking system.

19. The system according to claim 15, wherein each device of said second plurality of detection devices belongs to the group consisting of: digital camera; infrared digital camera; satellite navigation system, GPS or the like; Long-Range Radar Module; Short/Medium range Radar module; remote sensing module of LIDAR type; ultrasound detection module.

20. The system according to claim 15, comprising a third plurality of detection devices of a second data connection sub-system of the vehicle, each device of said third plurality of detection devices belonging to the group consisting of: satellite navigator, GPS or the like, V2V-type communication module, V2I-type communication module.

* * * * *